(12) United States Patent
Hosoda

(10) Patent No.: US 9,064,105 B2
(45) Date of Patent: Jun. 23, 2015

(54) INFORMATION PROCESSING APPARATUS, CONTROL METHOD THEREFOR, AND PROGRAM

(75) Inventor: Yasuhiro Hosoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 13/238,648

(22) Filed: Sep. 21, 2011

(65) Prior Publication Data

US 2012/0096544 A1    Apr. 19, 2012

(30) Foreign Application Priority Data

Oct. 14, 2010 (JP) ................................ 2010-231884

(51) Int. Cl.
*G06F 21/00* (2013.01)
*G06F 21/41* (2013.01)
*G06F 21/30* (2013.01)
*H04L 29/06* (2006.01)

(52) U.S. Cl.
CPC ................ *G06F 21/41* (2013.01); *G06F 21/30* (2013.01); *H04L 63/0815* (2013.01)

(58) Field of Classification Search
CPC ..... G06F 21/41; G06F 21/30; H04L 63/0815; H04L 29/06
USPC ............... 726/8, 19, 21, 5; 713/165, 166, 182
See application file for complete search history.

(56) References Cited

U.S. PATENT DOCUMENTS

| | | | |
|---|---|---|---|
| 5,689,638 A | 11/1997 | Sadovsky | |
| 6,256,734 B1 * | 7/2001 | Blaze et al. | 713/157 |
| 6,438,600 B1 * | 8/2002 | Greenfield et al. | 709/229 |
| 7,016,959 B2 * | 3/2006 | Dinh et al. | 709/225 |
| 7,254,831 B2 | 8/2007 | Saunders et al. | |
| 7,617,399 B2 | 11/2009 | Ebata | |
| 7,802,293 B2 * | 9/2010 | Boyer et al. | 726/6 |
| 8,082,442 B2 * | 12/2011 | Keljo et al. | 713/164 |

(Continued)

FOREIGN PATENT DOCUMENTS

| | | |
|---|---|---|
| CN | 1532661 A | 9/2004 |
| CN | 101518038 A | 8/2009 |

(Continued)

OTHER PUBLICATIONS

Geer, David. "Taking steps to secure web services." Computer 36.10 (2003): pp. (14-16).*

(Continued)

*Primary Examiner* — Luu Pham
*Assistant Examiner* — Kari Schmidt
(74) *Attorney, Agent, or Firm* — Fitzpatrick, Cella, Harper & Scinto

(57) ABSTRACT

There are provided an information processing apparatus which provides a user credential sharing service on a user credential sharing condition intended by a vendor that creates an application, and a control method for the information processing apparatus. To accomplish this, the information processing apparatus generates sharing settings which defines a sharing condition for each item of a user credential among applications according to a manifest file acquired from each application. Upon receiving a request of a user credential from one of the applications, the information processing apparatus provides the user credential to the requesting application according to the generated sharing settings.

12 Claims, 13 Drawing Sheets

(56) References Cited

U.S. PATENT DOCUMENTS

| | | | |
|---|---|---|---|
| 8,141,140 B2* | 3/2012 | Wenzel et al. | 726/8 |
| 8,413,210 B2* | 4/2013 | Kuzin et al. | 726/2 |
| 8,589,691 B1* | 11/2013 | Hackborn et al. | 713/176 |
| 8,769,704 B2* | 7/2014 | Peddada et al. | 726/28 |
| 2003/0226036 A1* | 12/2003 | Bivens et al. | 713/201 |
| 2004/0111644 A1* | 6/2004 | Saunders et al. | 713/202 |
| 2004/0187009 A1* | 9/2004 | Ebata | 713/185 |
| 2005/0050321 A1* | 3/2005 | Murakoshi | 713/165 |
| 2007/0297615 A1* | 12/2007 | Clarke et al. | 380/286 |
| 2008/0022379 A1* | 1/2008 | Wray | 726/6 |
| 2008/0046983 A1* | 2/2008 | Lester et al. | 726/5 |
| 2008/0244685 A1* | 10/2008 | Andersson et al. | 726/1 |
| 2009/0217367 A1 | 8/2009 | Norman et al. | |
| 2009/0248695 A1* | 10/2009 | Ozzie et al. | 707/10 |
| 2010/0049992 A1* | 2/2010 | Leichsenring et al. | 713/193 |
| 2010/0185852 A1* | 7/2010 | Ogawa et al. | 713/165 |

FOREIGN PATENT DOCUMENTS

| | | |
|---|---|---|
| EP | 1 426 847 A2 | 6/2004 |
| JP | 08-263417 A | 10/1996 |

OTHER PUBLICATIONS

Camenisch, Jan, and Els Van Herreweghen. "Design and implementation of the idemix anonymous credential system." Proceedings of the 9th ACM conference on Computer and communications security. ACM, 2002.*

Apr. 23, 2014 Chinese Office Action in Chinese Patent Application No. 201110312116.5.

* cited by examiner

FIG. 4

ADDITIONAL INSTALLATION OF APPLICATION

| INPUT FILE PATH | INSTALL |

MANAGEMENT OF INSTALLED APPLICATIONS

| UNINSTALL | START | STOP |

| LOGIN APPLICATION | STATUS |
|---|---|
| ○ 3rd-Party IC-Card Login Application | INACTIVE |
| ◎ LOGIN APPLICATION 305 | ACTIVE |

| UNINSTALL | START | STOP |

| APPLICATION | STATUS |
|---|---|
| ☐ APPLICATION 306 | ACTIVE |
| ☐ APPLICATION 307 | ACTIVE |
| ☐ APPLICATION 308 | ACTIVE |

| Void SetUserCredential ( String ApplicationID, int CredentialID, int Type, Object value); | |
|---|---|
| ARGUMENT | |
| ApplicationID | IDENTIFIER OF APPLICATION |
| CredentialID | IDENTIFIER OF USER CREDENTIAL |
| Type | TYPE OF USER CREDENTIAL<br>THIS INDICATES TYPE, FOR EXAMPLE, CHARACTER STRING SUCH AS USER ACCOUNT, PASSWORD AND DOMAIN NAME, HASH VALUE OF PASSWORD, ENCRYPTED PASSWORD, TICKET SUCH AS KERBEROS TGT AND SAML TICKET, BIOLOGICAL INFORMATION SUCH AS FINGER PRINTS, IC CARD INFORMATION HELD BY USER, OR THE LIKE |
| Value | USER CREDENTIAL DATA |

602

| ListObject GetUserCredential ( String ApplicationID, int CredentialID, Object value); | |
|---|---|
| ARGUMENT | |
| ApplicationID | IDENTIFIER OF APPLICATION |
| CredentialID | IDENTIFIER OF USER CREDENTIAL |
| RETURN VALUE | |
| | • RETURN REFERABLE USER CREDENTIAL DATA ASSOCIATED WITH CredentialID IN LIST FORM<br>• RETURN NULL IF THERE IS NO STORED USER CREDENTIAL OR IF THERE IS NO USABLE SHARING SETTINGS |

603

| KeyInformation GetKeyforEncryptCredential ( String ApplicationID, intCredentialID); | |
|---|---|
| ARGUMENT | |
| ApplicationID | IDENTIFIER OF APPLICATION |
| CredentialID | IDENTIFIER OF USER CREDENTIAL |
| RETURN VALUE | |
| | RETURN KEY INFORMATION (STRENGTH OF KEY, ALGORITHM, KEY DATA, AND THE LIKE) FOR ENCRYPTING/DECRYPTING USER CREDENTIAL DESIGNATED BY CredentialID |

FIG. 7

701
ApplicationID: 305
ApplicatonType: Login
ReadOnlySharedCredentialID: LoginAccount, LoginPassword ～710
TrustAppicationID: * ～711

702
ApplicationID: 306
ApplicatonType: Application ～712
ReferenceCredentialID: LoginAccount, LoginPassword
WritableSharedCredentialID: MailAccount, MailPassword ～714
TrustAppicationID: 307  （713）

703
ApplicationID: 307
ApplicatonType: Application
ReferenceCredentialID: LoginAccount, LoginPassword
WritableSharedCredentialID: MailAccount, MailPassword
TrustAppicationID: 306

704
ApplicationID: 308
ApplicatonType: Application
ReferenceCredentialID: LoginAccount, LoginPassword
WritableSharedCredentialID: FileServerAccount, FileServerPassword
TrustAppicationID: 309, 310

705
ApplicationID: 309
ApplicatonType: Application
ReferenceCredentialID: LoginAccount, LoginPassword
WritableSharedCredentialID: FileServerAccount, FileServerPassword
TrustAppicationID: 308

706
ApplicationID: 310   715
ApplicatonType: Application
ReferenceCredentialID: LoginAccount, LoginPassword
WritableSharedCredentialID: FileServerAccount, FileServerPassword
TrustAppicationID: 308    （716）

707
ApplicationID: 311
ApplicatonType: Application
ReferenceCredentialID: LoginAccount, LoginPassword
WritableSharedCredentialID: FileServerAccount, FileServerPassword
TrustAppicationID: 308

708
ApplicationID: 312
ApplicatonType: Application
ReferenceCredentialID: LoginAccount, LoginPassword ～718
WritableEncryptSharedCredentialID: WebProxyAccount, WebProxyPassword
TrustAppicationID: 313    （717）

709
ApplicationID: 313
ApplicatonType: Application
ReferenceCredentialID: LoginAccount, LoginPassword ～718
WritableEncryptSharedCredentialID: WebProxyAccount, WebProxyPassword
TrustAppicationID: 312

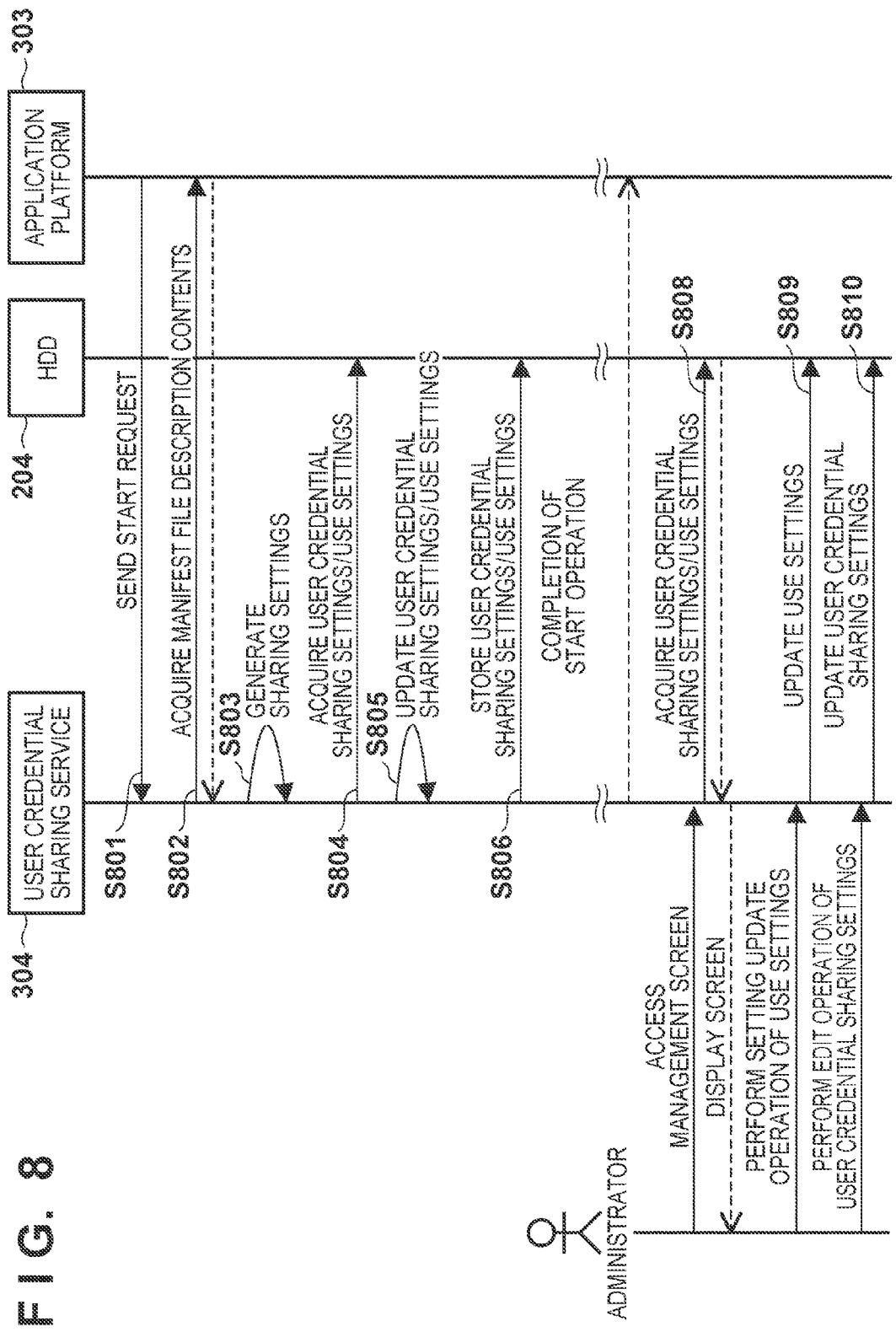

| CREDENTIAL ID | TYPE | MANAGEMENT ID | USER CREDENTIAL-UPDATABLE APPLICATION | USER CREDENTIAL-REFERABLE APPLICATION |
|---|---|---|---|---|
| LoginAccount | CHARACTER STRING | LoginAccount_001 | 305 | * |
| LoginPassword | CHARACTER STRING | LoginPassword_001 | 305 | * |
| MailAccount | CHARACTER STRING | MailAccount_001 | 306,307 | 306,307 |
| MailPassword | CHARACTER STRING | MailPassword_001 | 306,307 | 306,307 |
| FileServerAccount | CHARACTER STRING | FileServerAccount_001 | 308,309 | 308,309 |
| FileServerAccount | CHARACTER STRING | FileServerAccount_002 | 308,310 | 308,310 |
| FileServerAccount | CHARACTER STRING | FileServerAccount_003 | 311 | 308,311 |
| FileServerPassword | CHARACTER STRING | FileServerPassword_001 | 308,309 | 308,309 |
| FileServerPassword | CHARACTER STRING | FileServerPassword_002 | 308,310 | 308,310 |
| FileServerPassword | CHARACTER STRING | FileServerPassword_003 | 311 | 308,311 |
| WebProxyAccount | CHARACTER STRING | WebProxyAccount_001 | 312,313 | 312,313 |
| WebProxyPassword | CHARACTER STRING | WebProxyPassword_002 | 312,313 | 312,313 |

902

| MANAGEMENT ID | USE SETTING |
|---|---|
| LoginAccount_001 | TRUE |
| LoginPassword_001 | TRUE |
| MailAccount_001 | TRUE |
| MailPassword_001 | TRUE |
| FileServerAccount_001 | TRUE |
| FileServerAccount_002 | FALSE |
| FileServerAccount_003 | TRUE |
| FileServerPassword_001 | TRUE |
| FileServerPassword_002 | FALSE |
| FileServerPassword_003 | TRUE |
| WebProxyAccount_001 | TRUE |
| WebProxyPassword_002 | TRUE |

FIG. 10

| USE SETTING | CREDENTIAL ID | MANAGEMENT ID | USER CREDENTIAL-UPDATABLE APPLICATION | USER CREDENTIAL-REFERABLE APPLICATION |
|---|---|---|---|---|
| ☑ | LoginAccount | LoginAccount_001 | 305 | * |
| ☑ | LoginPassword | LoginPassword_001 | 305 | * |
| ☑ | MailAccount | MailAccount_001 | 306,307 | 306,307 |
| ☑ | MailPassword | MailPassword_001 | 306,307 | 306,307 |
| ☑ | FileServerAccount | FileServerAccount_001 | 308,309 | 308,309 |
| ☑ | FileServerAccount | FileServerAccount_002 | 308,310 | 308,310 |
| ☐ | FileServerAccount | FileServerAccount_003 | 311 | 308,311 |
| ☑ | FileServerPassword | FileServerPassword_001 | 308,309 | 308,309 |
| ☑ | FileServerPassword | FileServerPassword_002 | 308,310 | 308,310 |
| ☐ | FileServerPassword | FileServerPassword_003 | 311 | 308,311 |
| ☑ | WebProxyAccount | WebProxyAccount_001 | 312,313 | 312,313 |
| ☑ | WebProxyPassword | WebProxyPassword_002 | 312,313 | 312,313 |

FIG. 11

| SELECT | CREDENTIAL ID | MANAGEMENT ID | USER CREDENTIAL-UPDATABLE APPLICATION | USER CREDENTIAL-REFERABLE APPLICATION |
|---|---|---|---|---|
| ☐ | LoginAccount | LoginAccount_001 | 305 | * |
| ☐ | LoginPassword | LoginPassword_001 | 305 | * |
| ☐ | MailAccount | MailAccount_001 | 306,307 | 306,307 |
| ☐ | MailPassword | MailPassword_001 | 306,307 | 306,307 |
| ☑ | FileServerAccount | FileServerAccount_001 | 308,309 | 308,309 |
| ☐ | FileServerAccount | FileServerAccount_002 | 308,310 | 308,310 |
| ☐ | FileServerAccount | FileServerAccount_003 | 311 | 308,311 |
| ☐ | FileServerPassword | FileServerPassword_001 | 308,309 | 308,309 |
| ☐ | FileServerPassword | FileServerPassword_002 | 308,310 | 308,310 |
| ☐ | FileServerPassword | FileServerPassword_003 | 311 | 308,311 |
| ☐ | WebProxyAccount | WebProxyAccount_001 | 312,313 | 312,313 |
| ☐ | WebProxyPassword | WebProxyPassword_002 | 312,313 | 312,313 |

EDIT SETTINGS — 1102
1100
1101

1110 — CREDENTIAL ID : FileServerAccount
MANAGEMENT ID : WebProxyAccount_001

USER CREDENTIAL-UPDATABLE APPLICATION

1103 — [308 309] [▷ ◁] [310 311]

USER CREDENTIAL-REFERABLE APPLICATION

1104 — [308 309] [▷ ◁] [310 311]

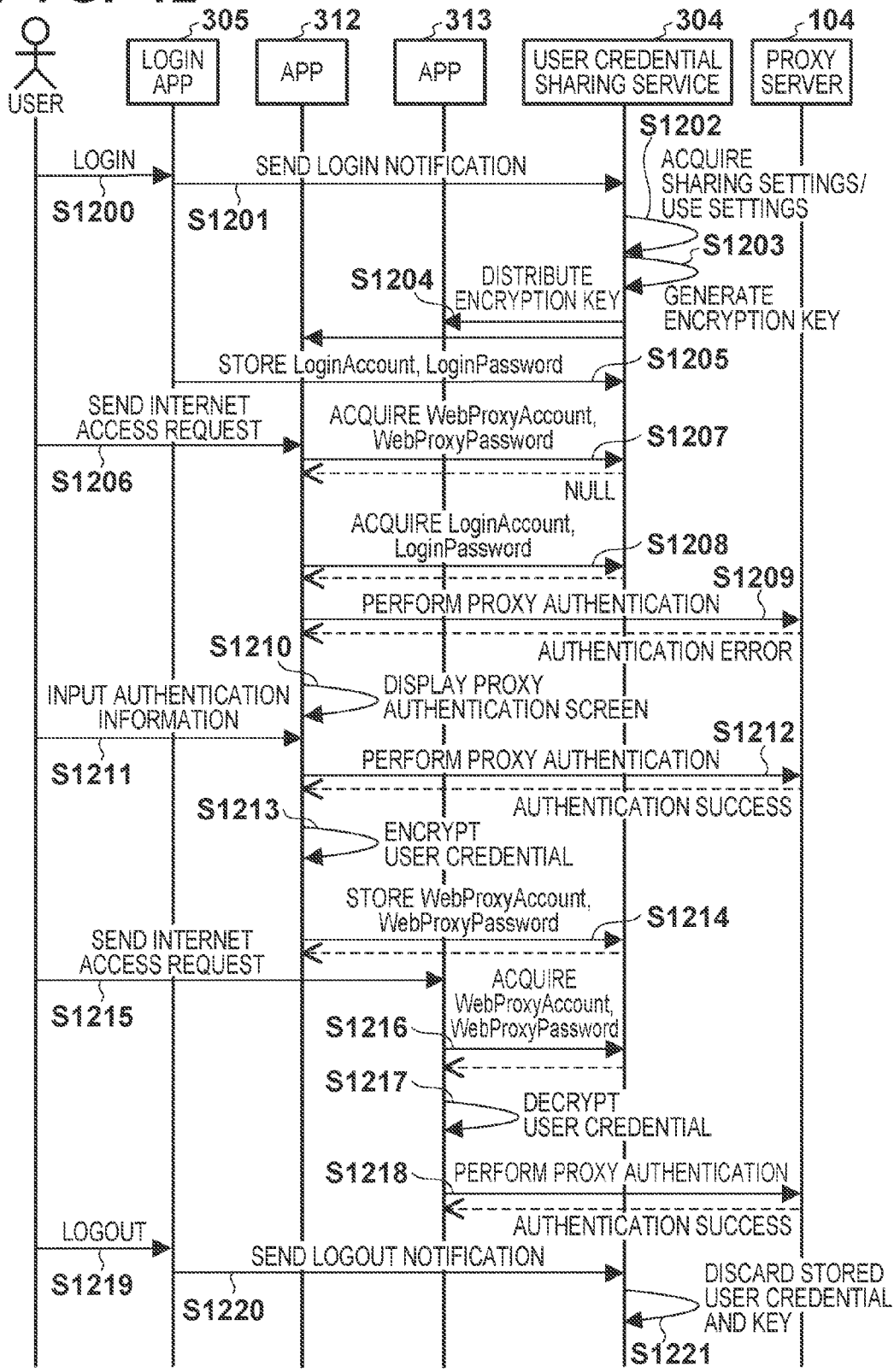

F I G. 13

| MANAGEMENT ID | ENCRYPTION KEY | VALUE | LAST UPDATE APPLICATION | UPDATE DATE/TIME |
|---|---|---|---|---|
| LoginAccount_001 | | Alice | 305 | 2010/5/6 10:07 |
| LoginPassword_001 | | Alicelogin | 305 | 2010/5/6 10:07 |
| WebProxyAccount_001 | ENCRYPTION KEY001 | ENCRYPTED DATA | 312 | 2010/5/6 10:09 |
| WebProxyPassword_002 | ENCRYPTION KEY002 | ENCRYPTED DATA | 312 | 2010/5/6 10:09 |

1300

INFORMATION PROCESSING APPARATUS, CONTROL METHOD THEREFOR, AND PROGRAM

BACKGROUND OF THE INVENTION

1. Field of the Invention

The present invention relates to an information processing apparatus that can be installed with a plurality of applications and share a user credential among the applications, a control method for the information processing apparatus, and a program.

2. Description of the Related Art

An image forming apparatus such as a copying machine or MFP (Multi Function Peripheral) which is connectable to a network can be additionally installed with a login application to authenticate a user and an embedded application. An example of an application executable on the image forming apparatus includes an application for transmitting a document read by a scanner to an external server via a network, and an application for connecting with an external server via a network to acquire external resources. Vendors other than that which provides the hardware of a device can create and sell applications.

If, every time the user accesses an external resource, he/she has to perform an authentication operation in such an image forming apparatus, this can place a heavy load on the user. Therefore, a single sign-on technique is known where the user only needs to perform an authentication operation once. For example, Japanese Patent Laid-Open No. 08-263417 has proposed a technique for sharing the user credential of a computer and a user credential for accessing external systems among network providers in the overall network system.

The conventional technique, however, has the following problems. That is, an image forming apparatus without any network provider which enables to share a user credential as disclosed in Japanese Patent Laid-Open No. 08-263417 cannot share a user credential among applications. Furthermore, if sharing a user credential among applications is allowed without any conditions, applications other than that which has registered the user credential may leak it outside. A vendor which creates an application, therefore, wants to share a user credential with only applications created by the vendor itself or trusted vendors. With a conventional user credential sharing method, however, a vendor which creates an application cannot limit applications with which a user credential is shared.

SUMMARY OF THE INVENTION

The present invention enables realization of an information processing apparatus which provides a user credential sharing service under a user credential sharing condition intended by a vendor that creates an application, a control method for the information processing apparatus, and a program.

One aspect of the present invention provides an information processing apparatus comprising: an acquisition unit that acquires, from each of a plurality of applications operating on the information processing apparatus, a sharing condition of a user credential with another application, which has been defined for each of a plurality of items of the user credential including information for certifying a user; a generation unit that generates, based on the acquired sharing condition, sharing settings which defines the sharing condition for each item of the user credential among applications, and stores the generated sharing settings in a memory; a holding unit that holds, in a memory, the user credential sent from at least one of the applications; and a provision unit that provides, upon receiving a request of the user credential from one of the applications, the user credential to the requesting application according to the sharing settings stored in the memory.

Another aspect of the present invention provides a control method for an information processing apparatus, comprising: acquiring, from each of a plurality of applications operating on the information processing apparatus, a sharing condition of a user credential with another application, which has been defined for each of a plurality of items of the user credential including information for certifying a user; generating, based on the acquired sharing condition, sharing settings which defines the sharing condition for each item of the user credential among applications, and storing the generated sharing settings in a memory; holding, in a memory, the user credential sent from at least one of the applications; and providing, upon receiving a request of the user credential from one of the applications, the user credential to the requesting application according to the sharing settings stored in the memory.

Still another aspect of the present invention provides a computer-readable storage medium storing a computer program for causing a computer to execute each step of a control method for the information processing apparatus.

Further features of the present invention will become apparent from the following description of exemplary embodiments with reference to the attached drawings.

BRIEF DESCRIPTION OF THE DRAWINGS

FIG. 4 is a view showing a user interface for managing applications according to the first embodiment;

FIG. 6 is a view showing APIs of a user credential sharing service according to the first embodiment;

FIG. 7 is a view showing the manifest files of applications according to the first embodiment;

FIG. 8 is a sequence chart showing start and setting of the user credential sharing service according to the first embodiment;

FIG. 9 is a view showing user credential sharing settings/use settings according to the first embodiment;

FIG. 10 is a view showing a user interface for making use settings for the user credential sharing settings according to the first embodiment;

FIG. 11 is a view showing a user interface for editing the user credential sharing settings according to the first embodiment;

FIG. 12 is a sequence chart showing the use of the user credential sharing service according to the first embodiment; and FIG. 13 is a view showing a user credential data management table according to the first embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Network Configuration

With reference to FIGS. 1 to 13, the first embodiment of the present invention will be described below. A network configuration according to this embodiment will be explained first with reference to FIG. 1. In this embodiment, an image forming apparatus (information processing apparatus) such as an MFP, printer, facsimile, and copying machine is used as an example of a device.

Figure 1:
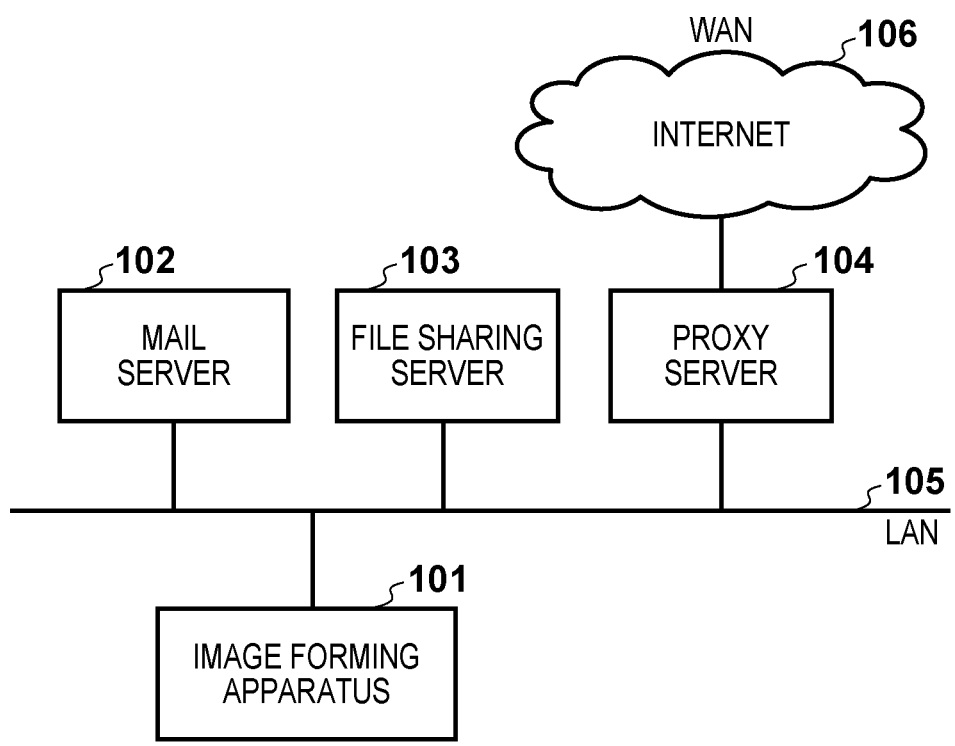
FIG. 1 is a block diagram showing a network configuration according to the first embodiment.

As shown in FIG. 1, a local area network (LAN) 105 is communicably connected with an image forming apparatus 101, mail server 102, file sharing server 103, and proxy server 104. The mail server 102 includes protocols such as SMTP (Simple Mail Transfer Protocol) and POPS (Post Office Protocol Version 3). The file sharing server 103 includes protocols such as SMB (Server Message Block). The proxy server 104 is connected with the LAN 105 and the Internet (WLAN) 106, and is used as a proxy terminal when a terminal connected with the LAN 105 connects to the Internet 106. Each server 102, 103, or 104 has a user authentication function complying with each protocol for authenticating a user who wants to use the server.

<Hardware Configuration of Image Forming Apparatus>

Figure 2:
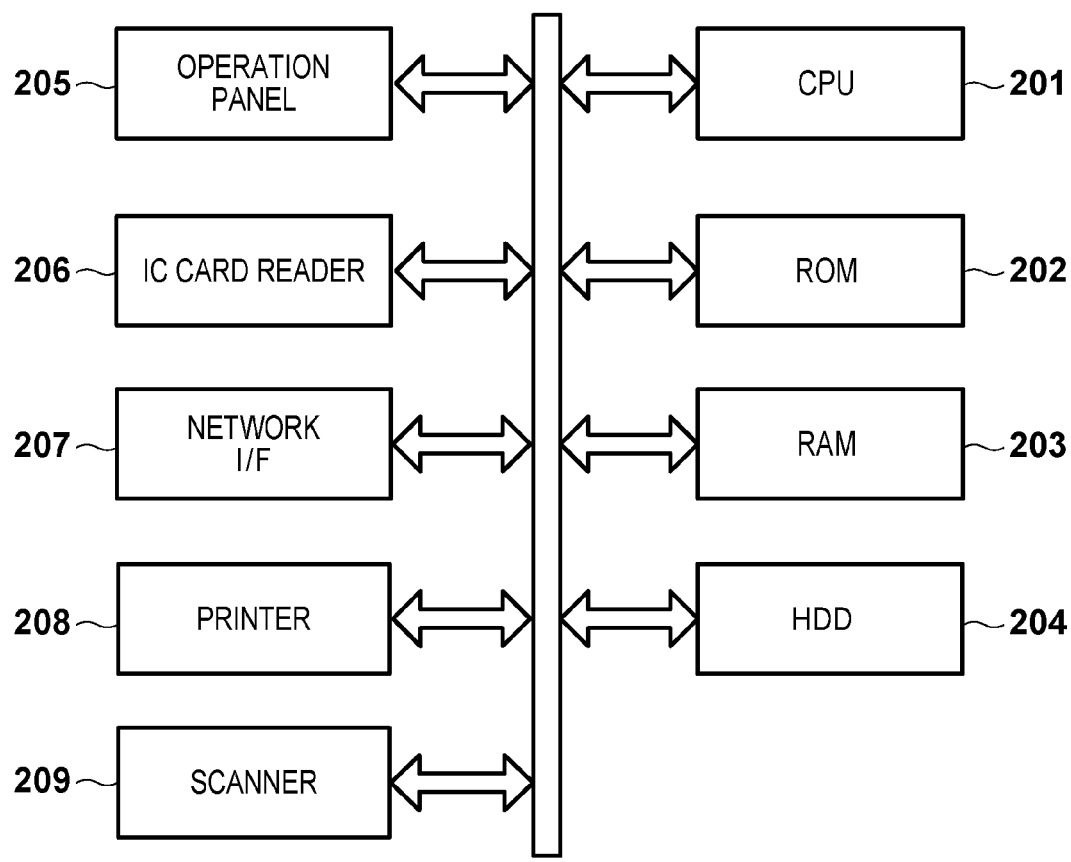
FIG. 2 is a block diagram showing the hardware configuration of an image forming apparatus according to the first embodiment.

With reference to FIG. 2, the hardware configuration of the image forming apparatus will be described next. The image forming apparatus 101 is an example of an information processing apparatus, and includes a CPU 201, ROM 202, RAM 203, HDD 204, operation panel 205, IC card reader 206, network I/F 207, printer 208, and scanner 209. The CPU 201 performs executive control of the image forming apparatus 101 as a whole. The ROM 202 is a read only memory for storing software programs executed by the CPU 201 and font data. The RAM 203 is a random access memory which is used as a work area of the CPU 201 and a reception buffer, and also used for image rendering. The HDD (Hard Disk Drive) 204 records data such as software program codes and user authentication information.

The operation panel 205 includes various switches and buttons, and a liquid crystal display unit for displaying messages. The IC card reader 206 is used for user authentication. The network I/F 207 is used to connect the image forming apparatus 101 with a network. The printer 208 prints printing paper sheets according to image data. The scanner 209 reads a printed document or the like, and converts it into electronic data.

<Software Configuration of Image Forming Apparatus>

Figure 3:
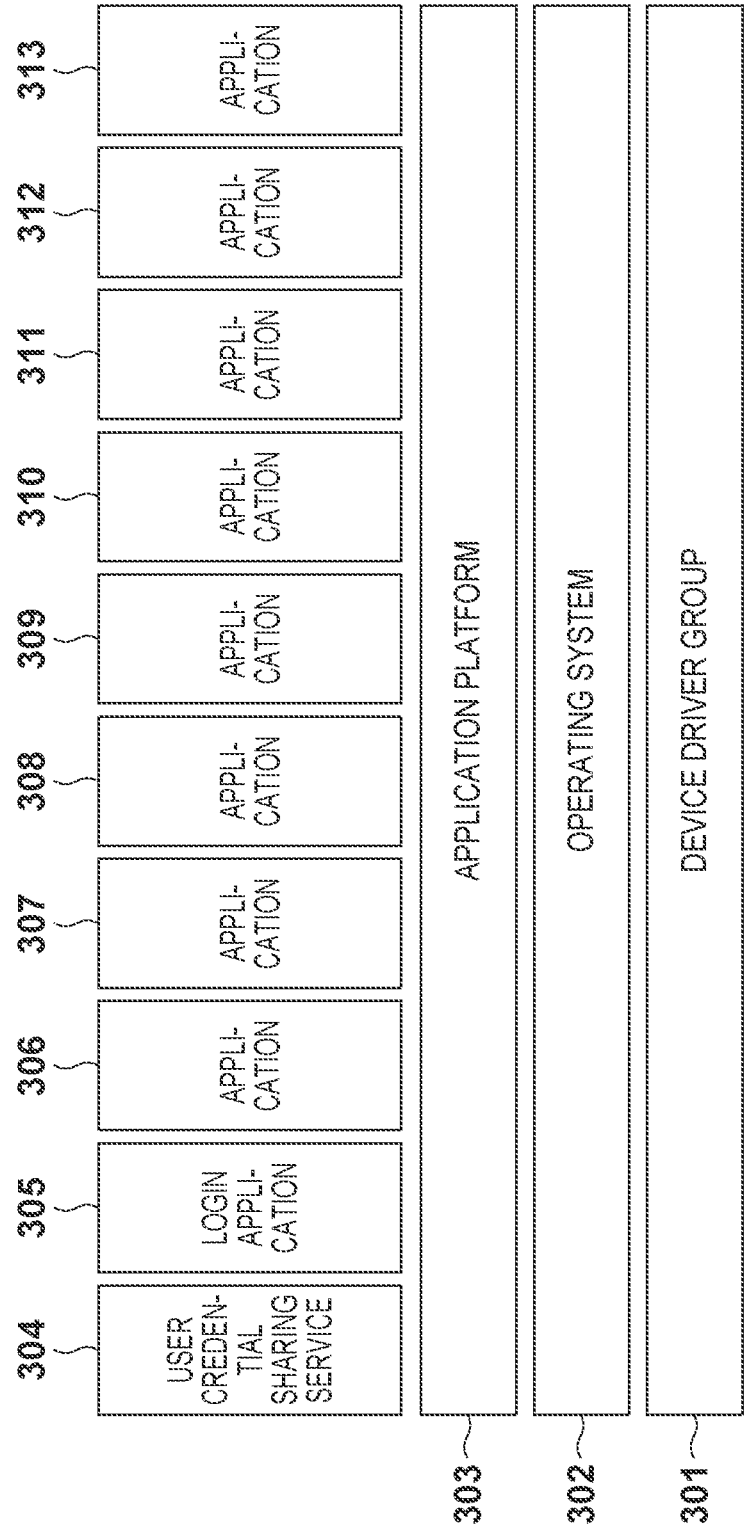
FIG. 3 is a block diagram showing the software configuration of the image forming apparatus according to the first embodiment.
Figure 5:
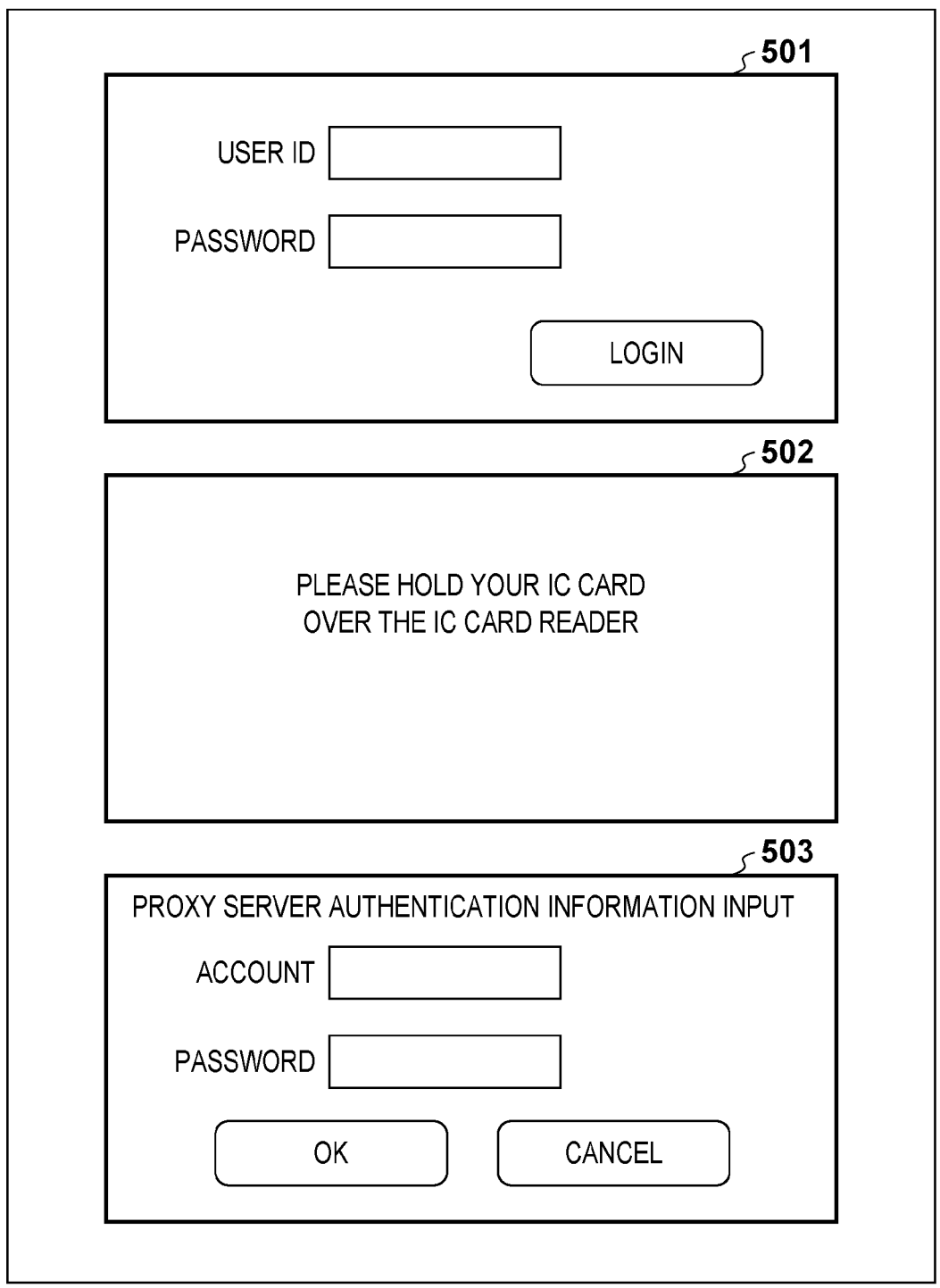
FIG. 5 is a view showing user authentication information input screens according to the first embodiment.

With reference to FIGS. 3 to 5, the software configuration of the image forming apparatus 101 and stored information will be explained. As shown in FIG. 3, the image forming apparatus 101 includes a device driver group 301, an operating system 302, an application platform 303, a user credential sharing service 304, a login application 305, and applications 306 to 313. The device driver group 301 includes a plurality of device drivers for controlling the various hardware components described above. The operating system 302 provides the interfaces of the device driver group 301 for the respective applications.

The application platform 303 installs/uninstalls an embedded application of the image forming apparatus 101, and controls a start/stop operation and the like. The application platform 303, for example, can be configured to include a JAVA® platform or an OSGi framework. JAVA® is a registered trademark of Sun Microsystems, Inc. The OSGi framework is a JAVA-based service platform defined by the OSGi Alliance (a standards organization). In addition to applications factory-installed on the image forming apparatus 101, the user can additionally install applications on the application platform 303. The application platform 303, for example, provides the user with a servlet having a user interface shown in FIG. 4 for managing the applications. The administrator of the image forming apparatus 101 can designate the execution file (JAR file) of an application to additionally install the application via a network.

<Application Types>

Application types will now be described. Applications operable on the application platform 303 include, for example, a system application, a login application, and a general application. When the type of application is not particularly limited, a simple expression "application" is used. A system application is factory-installed on the image forming apparatus 101. A login application is a special application used to authenticate a user who logs in the image forming apparatus 101. A general application is an application different from a login application, which can be installed/uninstalled by the user.

Referring back to FIG. 3, the user credential sharing service 304 serves as a system application. The login application 305 performs user authentication by displaying, on the operation panel, a user interface for inputting a user account/password as denoted by reference numeral 501 in FIG. 5. For example, the login application 305 may display a message "please hold your IC card over the IC card reader" as denoted by reference numeral 502 in FIG. 5, and perform user authentication based on IC card information acquired from the IC card reader 206. The applications 306 to 313 are general applications.

<User Credential>

In this embodiment, user authentication to be described below and information for certifying the user created after user authentication are collectively called a user credential. The user credential contains a user ID, a password, a domain name, the hash value of the password, an encrypted password, a ticket such as a Kerberos TGT and SAML (Security Assertion Markup Language) ticket, biological information such as finger prints, and IC card information held by the user.

<User Credential Sharing service 304>

The user credential sharing service 304 will be explained with reference to FIG. 6. The user credential sharing service 304 provides a service for enabling to share a user credential among applications. The user credential sharing service 304 includes APIs 601 to 603 shown in FIG. 6, which enable the service 304 to be used by applications. The SetUserCredential API 601 stores a user credential designated by an application in a memory such as the RAM 203. The GetUserCredential API 602 acquires a user credential stored in the RAM 203, and returns it to an application. Upon detecting user logout or shutdown of the image forming apparatus 101, the user credential sharing service 304 discards the user credential data stored in the RAM 203. The GetKeyforEncryptCredential API 603 returns generated key information to an application. The identifier (item) of the user credential used by the APIs 601 to 603 of FIG. 6 will be referred to as a credential ID hereinafter.

<Manifest File>

Manifest files will be described with reference to FIG. 7. The execution files of the login application 305 and general applications 306 to 313 respectively include manifest files 701 to 709 shown in FIG. 7. A vendor describes a manifest file when creating an application. This enables a vendor which creates an application to define information corresponding to a user credential sharing condition in a manifest file. The application platform 303 reads a corresponding manifest file when installing or starting an application. When an application or the image forming apparatus 101 starts, or the user logs in, the user credential sharing service 304 acquires a corresponding manifest file from the application platform 303, and generates user credential sharing settings (to be described later). Item names and values are described in the manifest files. In this embodiment, the items described in the manifest files are defined as follows.

ApplicationID

This indicates an identifier for uniquely specifying an application.

ApplilcationType

This indicates the type of application. A value "Login" in the manifest file 701 represents a login application, and a value "Application" in each of the manifest files 702 to 709 represents a general application.

TrustApplicationID

This indicates the identifier of a trusted application. When a trusted application is not limited, * is written.

ReferenceCredentialID

This indicates a credential ID whose user credential is only referred to.

ReadOnlySharedCredentialID

This indicates a credential ID whose user credential is only permitted to be referred to by a trusted application.

WritableSharedCredentialID

This indicates a credential ID whose user credential is permitted to be referred to and stored/updated by a trusted application.

WritableEncryptSharedCredentialID

This indicates a credential ID whose user credential is permitted to be referred to and stored/updated by a trusted application. The user credential is encrypted and stored in an area of the RAM 203, managed by the user credential sharing service 304.

CredentialType

This indicates the type of shared credential, for example, a character string such as a user account, a password and a domain name, the hash value of the password, an encrypted password, a ticket such as a Kerberos TGT and SAML ticket, biological information such as finger prints, IC card information held by the user, or the like. If nothing is described, a character string is assumed.

<Login Application 305>

The login application 305 has the manifest file 701. The login application 305 acquires an account and password input through the login screen 501, and authenticates the user who uses the image forming apparatus 101. The account and password of the user whose authentication has succeeded are recorded on the RAM 203 using the API of the user credential sharing service 304. Reference numeral 710 denotes that the login application 305 stores a credential ID (LoginAccount/LoginPassword) as a user credential which can be referred to by another application. Reference numeral 711 denotes that an application which refers to LoginAccount/LoginPassword is not limited and all applications are permitted to refer to LoginAccount/LoginPassword since the value is * (a wildcard).

<Applications 306 and 307>

The applications 306 and 307 are general applications which have a function of transmitting/receiving e-mail by accessing the mail server 102. The applications 306 and 307 have the manifest files 702 and 703, respectively. Reference numeral 712 denotes that the application 306 refers to LoginAccount/LoginPassword stored by the login application 305 using the API of the user credential sharing service 304. The application 306 uses LoginAccount/LoginPassword for authentication in accessing the mail server 102. Similarly, other applications 307 to 313 use LoginAccount/LoginPassword as authentication information in accessing an external server. Reference numeral 713 denotes that the applications 306 and 307 have a trust relationship between them. Reference numeral 714 denotes that the applications 306 and 307 share, via the user credential sharing service 304, an account and password for accessing the mail server 102 as MailAccount/MailPassword.

<Applications 308, 309, 310, and 311>

The applications 308, 309, 310, and 311 are general applications for accessing the file sharing server 103. These applications have a function of converting a document read by the scanner 209 into PDF data and transmitting it to the file sharing server 103, and a function of printing, using the printer 208, a document acquired from the file sharing server 103. The applications 308, 309, 310, and 311 have the manifest files 704, 705, 706, and 707, respectively. Reference numeral 715 denotes that the applications share, via the user credential sharing service 304, an account/password for accessing the file sharing server 103 as FileServerAccount/FileServerMailPassword. Reference numeral 716 denotes that the application 308 has trust relationships with the applications 309 and 310 but there is no trust relationship between the applications 309 and 310. Furthermore, it is indicated that the application 311 trusts the application 308 but the application 308 does not trust the application 311.

<Applications 312 and 313>

The applications 312 and 313 are general applications for acquiring information by accessing a Web server on the Internet (WAN 106). Since the applications 312 and 313 access the Internet (WAN 106) via the proxy server 104, they are required to undergo authentication to use the proxy server 104. The applications 312 and 313 have the manifest files 708 and 709, respectively. Reference numeral 717 denotes that the applications 312 and 313 have a trust relationship between them. Reference numeral 718 denotes that the applications 312 and 313 share, in an encrypted state, an account and password for accessing the proxy server 104 as WebProxyAccount and WebProxyPassword.

<Operation Associated with Start of User Credential Sharing service 304>

With reference to FIG. 8, an operation associated with start of the user credential sharing service 304 according to this embodiment will be explained next. Processing to be described below is implemented when the CPU 201 reads out a program from the ROM 202 or HDD 204, and executes it.

In step S801, when the application platform 303 calls start processing, the user credential sharing service 304 starts the start processing. In step S802, the user credential sharing service 304 acquires, via the application platform 303, contents of the manifest files of all applications which have started. In step S803, the user credential sharing service 304 analyzes all the acquired manifest files, and generates proper user credential sharing settings 901 which defines sharing conditions among applications, as shown in FIG. 9. The user credential sharing settings contains a credential ID, a user credential type, a management ID indicating a storage area for a user credential issued by the user credential sharing service 304, ApplicationID of an application which can store/update the user credential in the storage area indicated by the management ID, and ApplicationID of an application which can refer to the user credential in the storage area indicated by the management ID.

Upon analyzing the data 715 and 716 of the manifest files, for example, the user credential sharing service 304 generates three management IDs indicating areas for storing FileServerPassword. A management ID FileServerPassword_001 indicates an area used by the applications 308 and 309 to share FileServerPassword. Similarly, a management ID FileServerPassword_002 indicates an area used by the applications 308 and 310 to share FileServerPassword. A management ID FileServerPassword_003 indicates an area used by the application 311 to perform a storage/update operation. Since the application 311 trusts the application 308, the application 308 can refer to the user credential of FileServerPassword_003. Since, however, the application 308 does not trust the application 311, the service 304 generates sharing settings so as not to store/update a credential for FileServerPassword_003 referable by the application 311.

In step S804, if the user credential sharing settings 901 generated when the user credential sharing service 304 started before and use settings 902 have been recorded in the HDD 204, the user credential sharing service 304 refers to and acquires them. The use setting 902 is information representing whether the user uses a user credential sharing function indicated by the user credential sharing settings 901. TRUE (valid) indicates that the user uses the function, and FALSE (invalid) indicates that the user does not use the function. That is, if the use setting 902 indicates TRUE, according to the user credential sharing settings 901, the user credential sharing service 304 determines whether to provide a corresponding user credential for an application. If the user credential sharing service 304 can acquire the previous user credential sharing settings from the HDD 204, it compares it with newly generated user credential sharing settings, and checks the difference between them.

If there is additional information, the user credential sharing service 304 updates the user credential sharing settings in step S805, and stores the updated information in the HDD 204 in step S806. In step S805, when the user credential sharing service 304 can acquire the previous use settings from the HDD 204, it newly adds additional information if any, thereby updating the use settings. If the user credential sharing service 304 cannot acquire the use settings from the HDD 204, it generates use settings to set initial values. In this embodiment, TRUE (indicating that the user uses the function) is set as initial values of use settings. The generated and updated use settings are stored in the HDD 204 in step S806.

The user credential sharing service 304 can recognize installation or start of a new application via the application platform 303. In this case, the user credential sharing service 304 analyzes the manifest file of the new application, and updates the user credential sharing settings/use settings recorded on the HDD 204.

As described above, the user credential sharing service 304 automatically generates user credential sharing settings using information described in the manifest file acquired from the application. This enables the user who finds it troublesome to input detailed settings for sharing a user credential to securely use the user credential sharing service 304 without worrying about the settings.

<Operation Associated with Setting of User Credential Sharing service 304>

The user credential sharing service 304 has a function of displaying, on the operation panel 205, a user interface 1000 used to make use settings of the user credential sharing settings shown in FIG. 10. The user interface 1000 is configured to be operable only by the administrator of the image forming apparatus 101. Reference numeral 1001 denotes checkboxes for changing the use settings 902 for the user credential sharing settings 901 generated by the user credential sharing service 304. The administrator selects checkboxes to set TRUE. In this embodiment, assume that all checkboxes are selected in an initial state. The administrator can deselect a checkbox to set FALSE. That is, the use settings 902 are used to validate or invalidate sharing conditions for the items of a user credential defined in the user credential sharing settings 901.

The user credential sharing service 304 has a function of displaying, on the operation panel 205, a user interface 1100 for editing the user credential sharing settings, as shown in FIG. 11. When, for example, the user selects some of checkboxes 1101 which correspond to settings to be edited, and then presses an edit button 1102, a user interface 1110 in FIG. 11 is displayed on the operation panel 205. The user interface 1110 displays a user credential-updatable application list 1103 and a user credential-referable application list 1104, and is configured so that the administrator can add/delete target applications.

Referring back to FIG. 8, an operation associated with setting of the user credential sharing service 304 will be described. Upon detecting access from the administrator, the user credential sharing service 304 acquires the user credential sharing settings 901 and use settings 902 from the HDD 204 in step S808, and displays the user interfaces 1000 and 1100. Upon detecting, for example, a use settings change operation of the administrator, the user credential sharing service 304 updates the use settings 902 and records the updated use settings in the HDD 204 in step S809. For the user credential sharing settings set to be used by the administrator, it may be possible to make use settings for each general user who uses the image forming apparatus 101. Upon detecting that the administrator has edited the user credential sharing settings using the user interfaces 1100 and 1110, the user credential sharing service 304 updates the user credential sharing settings 901 and records the updated information in the HDD 204 in step S810.

Some users who use an application may have a concern about user credential leakage and some may place emphasis on the usability of performing single sign-on. According to this embodiment, providing a user interface with which the user can change the user credential sharing settings 901 and use settings 902 allows the user to change the sharing settings as he/she wants. Since the user can also select not to use automatically generated user credential sharing settings, it is possible to prevent user credential leakage. When the user changes the automatically generated user credential sharing settings 901 to allow to share a user credential among a larger number of applications, it is possible to improve the usability of executing single sign-on.

<Operation when Operating User Credential Sharing service 304>

An operation example when another application uses the user credential sharing service 304 will be explained with reference to FIG. 12. Note that an operation is exemplified when the user uses the application 312 first after he/she logs in the image forming apparatus 101, and then logs out using the application 313. Processing of the user credential sharing service 304, login application 305, and applications 312 and 313 to be described below is implemented when the CPU 201 reads out a program from the ROM 202 or HDD 204, and executes it.

In step S1200, the user performs login operation by inputting his/her account and password through the login screen

501 displayed on the operation panel 205 of the image forming apparatus 101. In step S1201, upon confirming that the user is an authorized user by verifying the input account and password, the login application 305 notifies the user credential sharing service 304 that the user has logged in. Upon receiving the user login notification, in step S1202 the user credential sharing service 304 refers to the user credential sharing settings 901 and use settings 902 stored in the HDD 204.

If the user credential sharing settings 901 contains WebProxyAccount_001/WebProxyPassword_001 which needs to be encrypted, in step S1203 the user credential sharing service 304 generates an encryption key used to encrypt/decrypt data, and holds it in the RAM 203. To generate a key, a common key cryptography such as AES is used. For example, a user credential data management table 1300 for managing data in association with management IDs is prepared on the RAM 203. In this example, the service 304 generates encryption key data 001 and 002, and stores them in association with WebProxyAccount_001 and WebProxyPassword_002, respectively.

In step S1204, the user credential sharing service 304 distributes the generated encryption key to the applications 312 and 313 which use WebProxyAccount_001 and WebProxyPassword_002. The user credential sharing service 304 may have the API 603 with which each application can acquire the encryption key at an arbitrary timing. In step S1205, the login application 305 uses the SetUserCredential API 601 to request the user credential sharing service 304 to store the account and password acquired in step S1200. By referring to the user credential sharing settings 901 and use settings 902, the user credential sharing service 304 checks if the login application 305 can update LoginAccount_001/LoginPassword_001. The user credential sharing service 304 stores the account/password (Alice/AliceLogin) in the user credential data management table 1300 in association with LoginAccount_001/LoginPassword_001. ApplicationID of the last update application and an update date/time are also recorded.

In step S1206, the application 312 detects a user operation which requires Internet access. In step S1207, the application 312 uses the GetUserCredential API 602 to request the user credential sharing service 304 to acquire WebProxyAccount/WebProxyPassword. Although the user credential sharing service 304 refers to the user credential data management table 1300, the table 1300 does not store WebProxyAccount_001/WebProxyPassword_001 immediately after login, thereby returning NULL.

If the application 312 could not acquire WebProxyAccount/WebProxyPassword, it requests the user credential sharing service 304 to acquire LoginAccount/LoginPassword in step S1208. The user credential sharing service 304 returns LoginAccount (Alice)/LoginPassword (AliceLogin). After that, in step S1209, the application 312 accesses the proxy server 104, and attempts authentication using the account and password acquired in step S1208. If the account (Alice) and password (AliceLogin) have been registered in the proxy server 104, authentication succeeds. In this case, the user can access the Internet without consciously undergoing authentication by the proxy server 104. Alternatively, if the account (Alice) and password (AliceLogin) have not been registered in the proxy server 104, an authentication error is sent.

Subsequent processing will be explained by assuming a case in which an authentication error has been sent. If authentication of the proxy server 104 has failed, in step S1210 the application 312 displays a proxy authentication screen 503 to prompt the user to input his/her account/password for proxy authentication. After that, when detecting a user input operation of an account/password for proxy authentication in step S1211, the application 312 accesses the proxy server 104 again to perform authentication processing using the input account/password in step S1212. If the proxy authentication processing has succeeded, in step S1213 the application 312 uses the encryption key acquired in step S1204 to encrypt the account/password with which the proxy authentication has succeeded. After that, in step S1214, the application 312 uses the SetUserCredential API 601 to store the encrypted account/password in the user credential sharing service.

In step S1215, the application 313 detects a user operation which requires Internet access. In step S1216, the application 313 uses the GetUserCredential API 602 to request the user credential sharing service 304 to acquire WebProxyAccount/WebProxyPassword. By referring to the user credential sharing settings 901 and use settings 902, the user credential sharing service 304 checks if the application 313 can refer to WebProxyAccount_001/WebProxyPassword_001. If so, the user credential sharing service 304 refers to the user credential data management table 1300, and then returns the encrypted account/password stored in WebProxyAccount_001/WebProxyPassword_001. If it is possible to refer to a plurality of accounts/passwords associated with management IDs for one credential ID, the service 304 returns the plurality of accounts/passwords. In this case, the service 304 may return the accounts/passwords by sorting them in the order of higher priority in consideration of an application which has performed storage operation, an update date/time, and the like.

When the application 313 has successfully acquired the encrypted account/password, in step S1217 it decrypts encrypted data using the encryption key acquired in step S1204, thereby acquiring an account/password. In step S1218, the application 313 accesses the proxy server 104 to perform authentication processing using the acquired account/password.

Upon detecting a user logout operation in step S1219, the login application 305 sends a logout notification to the user credential sharing service 304 in step S1220. Upon receiving the logout notification, in step S1221 the user credential sharing service 304 discards all data recorded in the user credential data management table 1300.

<Supplementary Explanation of SetUserCredential API>

If there exist a plurality of updatable management IDs associated with CredentialID designated as an argument, the SetUserCredential API 601 stores a user credential in all areas indicated by the management IDs. For example, an operation when the application 308 calls the SetUserCredential API 601 by designating FileServerPassword as CredentialID will be described. By referring to the user credential sharing settings 901 and use settings 902, the user credential sharing service 304 confirms that the application 308 can update FileServerPassword_001/FileServerPassword_002. Then, the service 304 stores user credential data designated as arguments in association with FileServerPassword_001/FileServerPassword_002 of the user credential data management table 1300, respectively.

Other Embodiments

In the above embodiment, a case in which an account/password is shared using the user credential sharing service 304 has been described. The present invention, however, is not limited to this. It may also be possible to share, using the user credential sharing service 304, the hash value of a password, a ticket such as a Kerberos TGT and SAML ticket, biological information such as finger prints, IC card information held by the user, and the like as another user credential.

In the above embodiment, an application ID serving as information indicating a sharing destination application is described as TrustApplicationID in a manifest file. However, other information may be described as long as the information is associated with the application. For example, information about a vendor which has created an application may be described in a manifest file, and all applications created by the vendor may be designated as sharing destinations. Furthermore, application group information may be described in a manifest file, and all applications belonging to the application group may be designated as sharing destinations.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-231884 filed on Oct. 14, 2010, which is hereby incorporated by reference herein in its entirety.

What is claimed is:

1. An information processing apparatus comprising:
   an acquisition unit that acquires, from each of a plurality of applications operating on said information processing apparatus, manifest information defining a sharing condition for indicating another application out of the plurality of applications which is trusted by the application to access a user credential, wherein the user credential includes information for certifying a user;
   a generation unit that analyzes the manifest information acquired from each of the plurality of applications, and, based on the analyzing result, generates sharing settings which define sharing conditions for sharing the user credential among the applications, and stores the generated sharing settings in a memory;
   a holding unit that holds, in a memory, the user credential sent from at least one of the applications;
   a provision unit that provides, upon receiving a request of the user credential from one of the applications, the requested user credential to the requesting application according to the stored sharing settings, wherein the provision unit includes:
      (a) an encryption unit that encrypts the user credential held by said holding unit, and
      (b) a distribution unit that distributes, to each application, an encryption key used to encrypt the user credential held by said holding unit;
   a non-transitory computer-readable memory configured to store computer-executable process steps; and
   a processor configured to function as at least one of the acquisition unit, the generation unit, the holding unit, and the provision unit by executing the computer-executable process steps stored in the memory,
   wherein the manifest information acquired from each of the plurality of applications is created by one or more respective vendors of each of the plurality of applications, and
   wherein the manifest information acquired from each of the plurality of applications is read by an application platform, when the application platform is installing or starting the application.

2. The apparatus according to claim 1, wherein said generation unit generates the sharing settings when said apparatus starts, when an application starts, or when the user logs in, compares the generated sharing settings with the already-stored sharing settings, and updates the memory with the generated sharing settings if there is a difference as a comparison result.

3. The apparatus according to claim 1, wherein said holding unit furthermore holds, in a memory, a use setting for setting to validate or invalidate the sharing condition for the user credentials defined in the sharing settings, and
   when the use setting indicates a valid state, said provision unit determines based on the sharing settings whether to provide the user credential to the requesting application.

4. The apparatus according to claim 3, further comprising a user interface for changing the sharing settings and the held use setting.

5. The apparatus according to claim 1, wherein said provision unit (a) does not provide the requested user credential if the application which has requested the user credential is not defined in the sharing settings to share the user credential, and (b) provides the requested user credential if the application which has requested the user credential is defined in the sharing settings to share the user credential.

6. The apparatus according to claim 1, wherein the plurality of applications include a login application for issuing a user credential of an authenticated user, and
   wherein said holding unit holds the user credential, which has been issued by the login application, of the user for whom the login application has executed authentication, and deletes the held user credential when the user logs out.

7. The apparatus according to claim 1, wherein for each user credential, the sharing settings contain information about an application capable of referring to user credential information and information about an application capable of updating the user credential information.

8. The apparatus according to claim 1, wherein a user credential contains a user ID, a password, a domain name, the hash value of the password, an encrypted password, a ticket such as a Kerberos TGT and SAML ticket, biological information, or IC card information held by the user.

9. The apparatus according to claim 1, wherein the manifest information from each application is a manifest file included in the respective application.

10. The apparatus according to claim 1, wherein the generation unit stores the generated sharing settings in a first memory, and
    wherein the holding unit holds the user credential in a second memory that is different from the first memory.

11. A control method for an information processing apparatus, the method comprising:
    acquiring, from each of a plurality of applications operating on the information processing apparatus, manifest information defining a sharing condition for indicating another application out of the plurality of applications which is trusted by the application to access a user credential, wherein the user credential includes information for certifying a user;

analyzing the manifest information acquired from each of the plurality of applications, generating, based on the analyzing result, sharing settings which define the sharing conditions for sharing the user credential among the applications, and storing the generated sharing settings in a memory;

holding, in a memory, the user credential sent from at least one of the applications; and providing, upon receiving a request of the user credential from one of the applications, the requested user credential to the requesting application according to the stored sharing settings, wherein the providing includes (a) encrypting the held user credential, and (b) distributing, to each application, an encryption key used to encrypt the held user credential, wherein the manifest information acquired from each of the plurality of applications is created by one or more respective vendors of each of the plurality of applications, and wherein the manifest information acquired from each of the plurality of applications is read by an application platform, when the application platform is installing or starting the application.

12. A non-transitory computer-readable storage medium storing a computer program for causing a computer to execute each step of a control method for an information processing apparatus, the control method comprising:

acquiring, from each of a plurality of applications operating on the information processing apparatus, manifest information defining a sharing condition for indicating another application out of the plurality of applications which is trusted by the application to access a user credential, wherein the user credential includes information for certifying a user;

analyzing the manifest information acquired from each of the plurality of applications, generating, based on the analyzing result, sharing settings which define the sharing conditions for sharing the user credential among the applications, and storing the generated sharing settings in a memory;

holding, in a memory, the user credential sent from at least one of the applications; and providing, upon receiving a request of the user credential from one of the applications, the requested user credential to the requesting application according to the stored sharing settings, wherein the providing includes (a) encrypting the held user credential, and (b) distributing, to each application, an encryption key used to encrypt the held user credential, wherein the manifest information acquired from each of the plurality of applications is created by one or more respective vendors of each of the plurality of applications, and wherein the manifest information acquired from each of the plurality of applications is read by an application platform, when the application platform is installing or starting the application.

\* \* \* \* \*